(12) United States Patent
Jeanne et al.

(10) Patent No.: US 10,171,414 B2
(45) Date of Patent: Jan. 1, 2019

(54) METHOD FOR ALLOCATING INTERNET PROTOCOL ADDRESSES TO CLIENTS OF A NETWORK AND CORRESPONDING APPARATUS

(71) Applicant: THOMSON LICENSING, Issy les Moulineaux (FR)

(72) Inventors: Ludovic Jeanne, Montreuil sur Ille (FR); Jose Terol, Fougères (FR); Lucien Graef, Poligne (FR); Geert Van Den Bossche, Lokeren (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 251 days.

(21) Appl. No.: 15/146,114

(22) Filed: May 4, 2016

(65) Prior Publication Data

US 2016/0330165 A1 Nov. 10, 2016

(30) Foreign Application Priority Data

May 6, 2015 (EP) ..................................... 15305694

(51) Int. Cl.
*H04L 29/12* (2006.01)
*H04L 12/66* (2006.01)
(Continued)

(52) U.S. Cl.
CPC ............ *H04L 61/103* (2013.01); *H04L 12/66* (2013.01); *H04L 43/10* (2013.01); *H04L 43/12* (2013.01);
(Continued)

(58) Field of Classification Search
CPC ..................................................... H04L 61/103
See application file for complete search history.

(56) References Cited

U.S. PATENT DOCUMENTS 7,046,666 B1 * 5/2006 Bollay .............. H04L 29/12009
370/392
8,166,187 B2 4/2012 Gowda et al.
(Continued)

FOREIGN PATENT DOCUMENTS

JP 2006246223 9/2006

OTHER PUBLICATIONS

Anonymous, "Pharos MAXtream introduction", http://forum.tp-link.com/showthread.php?78930-Pharos-MAXtream-introduction&p=156842&viewfull=1#post156842, Jan. 19, 2015, pp. 1-7.
(Continued)

*Primary Examiner* — Suraj Joshi
(74) *Attorney, Agent, or Firm* — Volpe and Koenig, P.C.

(57) ABSTRACT

An access device and an extender access device, forming a network for network client devices. A single IP address attribution server in the network attributes IP addresses to network devices based on their MAC address. The access device providing access in a first coverage zone. The extender access device providing access in a second coverage zone. The extender access device implements MAC address translation for representing network client devices in the second zone before the access device. When a network client device roams from the second zone to the first zone, the client device keeps its IP address that was attributed to it by the IP address attribution server via the extender access device even if the client device requests an IP address with its real, non-translated MAC address.

16 Claims, 9 Drawing Sheets

(51) Int. Cl.
  *H04L 12/26* (2006.01)
  *H04L 12/751* (2013.01)
  *H04W 16/26* (2009.01)
  *H04W 84/12* (2009.01)

(52) U.S. Cl.
  CPC .......... *H04L 45/02* (2013.01); *H04L 61/2007* (2013.01); *H04L 61/2015* (2013.01); *H04L 61/2596* (2013.01); *H04L 61/6022* (2013.01); *H04W 16/26* (2013.01); *H04L 61/2038* (2013.01); *H04L 61/2046* (2013.01); *H04W 84/12* (2013.01)

(56) References Cited

U.S. PATENT DOCUMENTS

| | | | | |
|---|---|---|---|---|
| 2003/0217145 | A1* | 11/2003 | Leung | H04L 61/2015 709/224 |
| 2006/0206597 | A1* | 9/2006 | Kim | H04L 29/12311 709/220 |
| 2008/0008192 | A1 | 1/2008 | Matoba | |
| 2008/0288614 | A1 | 11/2008 | Gil et al. | |
| 2010/0217847 | A1* | 8/2010 | Cook | H04L 29/12584 709/222 |
| 2011/0158127 | A1* | 6/2011 | Duo | H04W 48/16 370/254 |
| 2014/0254597 | A1 | 9/2014 | Tian et al. | |

OTHER PUBLICATIONS

Anonymous, "Helpmesolve.It—WN2500RP and Wireless Card Access Lists", http://www.helpmesolve.it/answers/578/wn2500rp+and+wireless+card+access+lists.html, Apr. 15, 2012, pp. 1-2.

Anonymous, "Netgear AC1200 Wifi Range Extender Model EX6200 user manual", Netgear Inc., Jan. 2015, pp. 1-5 and 115-118.

Begley, M., "The Public Ethernet Network: The Next-Generation Broadband Access Network", Annual Review of Communications, vol. 57, Jan. 1, 2004, pp. 531-539.

Speicher, S., "OLSR-FastSync: Fast Post-Handoff Route Discovery in Wireless Mesh Networks", IEEE Vehicular Technology Conference, Montreal, Quebec, Canada, Sep. 25, 2006, pp. 1-5.

Tauseef et al., "Cooperative Relaying for Wireless Local Area Networks", in Wireless networking for Moving Objects, LNCS 8611, Springer International Publishing, Switzerland, 2014, pp. 50-69.

* cited by examiner

METHOD FOR ALLOCATING INTERNET PROTOCOL ADDRESSES TO CLIENTS OF A NETWORK AND CORRESPONDING APPARATUS

This application claims the benefit, under 35 U.S.C. § 119 of European Patent Application No. 15305694.0, filed May 6, 2015.

1. TECHNICAL FIELD

The present disclosure generally relates to the field of data communication networks and in particular to access points (APs) in combination with network extenders.

2. TECHNICAL BACKGROUND

Wireless access points emit radio waves that are attenuated by furniture, doors, walls, windows, ceilings and floors. Consequently, good wireless network coverage in all areas of a building or a home can often not be ensured with a single wireless access point. For example, it is known that a wooden door attenuates a WiFi signal by 3 dB, which is half the signal strength, while a concrete wall or ceiling can attenuate a WiFi signal by as much as 10-15 dB (i.e., to about one eighth of the original signal). Attenuation is even more important in the presence of metal, such as tinted windows or steel reinforced concrete. Wireless network extenders, also called wireless repeaters (further referred to as wireless network extenders), can cover areas that are not or poorly covered by a single wireless access point and improve overall wireless network coverage. Wireless network extenders that wirelessly communicate with an access point are used when additional cabling is not wished or impossible.

In networking, the Media Access Control (MAC) is an ISO (International Organization for Standardization) level 2 or data link layer protocol that provides addressing and channel access control mechanisms that allow multiple client devices to communicate over a shared medium such as wired Ethernet or a wireless medium. The MAC address is a unique serial number assigned to a network interface of a network client device. A destination Internet Protocol (IP) address (ISO layer 3 or network layer) is resolved with the IPv4 Address Resolution Protocol (ARP) or with the IPv6 Neighbor Discovery Protocol to the MAC address of the destination network interface of a destination network client device. When a wireless network extender is configured to function as a network bridge, the wireless network covered by the access point and covered by the wireless network extender is seen as a single network from the access point of view, within a single network layer address space. The wireless network extender functions as a bidirectional relay for data communication between the wireless access point and wireless network client devices connected to the wireless network extender. The wireless network extender represents the wireless network client devices connected to it before the access point.

Inside a building, office or home, areas can exist that are covered both by the access point and the network extender. These areas are further referred to as areas of common coverage. As mentioned above, the network communication is based on a uniqueness of MAC addresses within the network. If the MAC address of a wireless network client device and that of its representation by the wireless network extender are the same, both the wireless network extender and the wireless network client device reply to messages from the access point in the common coverage areas. This causes data collisions that make data communication impossible between the wireless access point and the wireless network client device. Therefore, wireless network extenders employ MAC address translation. When the wireless network extender relays a data link layer message from a wireless network client device to the access point, it replaces the real MAC address of the wireless network client device in the message to a translated MAC address (TMAC). When the wireless network extender relays a data link layer message from the access point to a wireless network client device, it replaces the translated MAC address in the message by the real MAC address of the wireless network client device. This solves the problem of uniqueness of MAC addresses in the common coverage areas: any data link layer message transmitted from the wireless access point that has as a destination a wireless network client device that is connected to the wireless network extender is addressed to the translated MAC address of the destination wireless network client device and will continue to be relayed by the wireless network extender to the destination wireless network client device. Vice versa for data link messages that are transmitted from a wireless network client device to the access point and that are relayed by the wireless network extender.

While this solves the above discussed problem of communication loss in areas of common coverage of the access point and of the wireless network extender, the MAC address translation causes a problem of communication loss when the client device roams from the wireless network extender to the access point to a coverage area that is only covered by the access point and the wireless access point is configured to function as a bridge. In such a configuration, there is a single Dynamic Host Configuration Protocol (DHCP) server in the network. For communication on the network layer level (ISO level 3), the DHCP server attributes IP addresses to client devices of the network based on their MAC address. When a wireless network client device is 'attached' to the wireless network extender, its IP address allocation is based on its translated MAC address. When the wireless network client device roams to an area that is covered by the access point only, it will have to issue a DHCP request to obtain an IP address. In its DHCP request, the wireless network client device will provide its real MAC address. Instead of retrieving the IP address that was allocated to it before the roaming, the DHCP server will attribute a new IP address to the client device as the real MAC address of the wireless network client device is yet unknown to the DHCP server. As a consequence, any IP packets that are destined to the client device based on its previous IP address are lost, causing a communication disruption a.k.a. IP session discontinuity.

There is thus a need to improve prior techniques.

3. SUMMARY

The present disclosure aims at alleviating some of the inconveniences of prior art.

To this end, the present principles comprise a method for allocation of Internet Protocol addresses to network devices in a communication network. The communication network comprises an Internet Protocol address server and the method is implemented by the Internet Protocol address server. The method comprises receiving, from a first network device of the network devices in the communication network, a request for attribution of an Internet Protocol address to a Media Access Control address, the request comprising the Media Access Control address. If an Internet Protocol address is not attributed to the Media Access Control address, a Media Access Control address translation is applied to the Media Access Control address, to obtain a translated Media Access Control address. If an Internet Protocol address is attributed to the translated Media Access Control address, the Internet Protocol address attributed to the translated Media Access Control address is transmitted to the first network device.

According to a variant embodiment of the method for allocation of Internet Protocol addresses to network devices in a communication network, the method further comprises verifying if the translated Media Access Control address is not used by any of the network device in the communication network. This verifying comprises transmitting a message to the translated Media Access Control address; and checking that no reply is received to the message.

According to a variant embodiment of the method for allocation of Internet Protocol addresses to network devices in a communication network, the message is an Internet Protocol PING message.

According to a variant embodiment of the method for allocation of Internet Protocol addresses to network devices in a communication network the message is an Address Resolution Protocol probe packet.

According to a variant embodiment of the method for allocation of Internet Protocol addresses to network devices in a communication network the Media Access Control address translation comprises toggling of the globally unique/locally administered bit comprised in the most significant byte of the Organizationally Unique Identifier of the Media Access Control address comprised in the request.

According to a variant embodiment of the method for allocation of Internet Protocol addresses to network devices in a communication network the toggling is a logical exclusive logical Boolean OR operation with a bit mask applied to the Media Access Control address in the request.

According to a variant embodiment of the method for allocation of Internet Protocol addresses to network devices in a communication network, the method further comprises transmission of an announcement message over the communication network to inform the network devices in the communication network of a correspondence between the Medium Access Control address of the first network device and of the Internet Protocol address transmitted to the first network device.

According to a variant embodiment of the method for allocation of Internet Protocol addresses to network devices in a communication network, the method further comprises verifying if the translated Media Access Control address is on a list of allowable Media Access Control addresses for Media Access Control address filtering. If the translated Media Access Control address is on a list of allowable Media Access Control addresses for Media Access Control address filtering, updating of the list of allowable Media Access Control addresses for Media Access Control address filtering with the Media Access Control address of the first network device.

The present disclosure also relates to an Internet Protocol address server for allocation of Internet Protocol addresses to network devices in a communication network. The server comprises a network interface, configured to receive, from a first network device in the communication network, a request for attribution of an Internet Protocol address to a Media Access Control address, the request comprising the Media Access Control address. The server further comprises a processor, configured to apply a Media Access Control address translation to the Media Access Control address, to obtain a translated Media Access Control address if an Internet Protocol address is not attributed to the Media Access Control address. The network interface being further configured to transmit, to the first network device, an Internet Protocol address attributed to the translated Media Access Control address if an Internet Protocol address is attributed to the translated Media Access Control address.

According to a variant embodiment of the Internet Protocol address server, the processor is further configured to verify if the translated Media Access Control address is not used by any of the network devices in the communication network, the verifying comprising transmitting of a message to the translated Media Access Control address; and checking that no reply is received to the message.

According to a variant embodiment of the Internet Protocol address server, the message is an Internet Protocol PING message and the network interface is further configured to transmit the Internet Protocol PING message.

According to a variant embodiment of the Internet Protocol address server, the message is an Address Resolution Protocol probe packet and the network interface is further configured to transmit the Internet Protocol PING message.

According to a variant embodiment of the Internet Protocol address server, the processor is further configured to execute the Media Access Control address translation by toggling a globally unique/locally administered bit comprised in the most significant byte of the Organizationally Unique Identifier of the Media Access Control address comprised in the request.

According to a variant embodiment of the Internet Protocol address server, the processor is further configured to execute the toggling by applying a logical exclusive logical Boolean OR operation with a bit mask applied to the Media Access Control address comprised in the request.

According to a variant embodiment of the Internet Protocol address server, the network interface is further configured to transmit an announcement message over the communication network to inform the network devices in the communication network of a correspondence between the first network device's Medium Access Control address and of the Internet Protocol address transmitted to the first network device.

According to a variant embodiment of the Internet Protocol address server, the server is in a gateway.

4. LIST OF FIGURES

More advantages of the present principles will appear through the description of particular, non-restricting embodiments of the disclosure. In order to describe the manner in which the advantages of the present principles can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring of the disclosure.

The exemplary embodiments will be described with reference to the following figures.

5. DETAILED DESCRIPTION

Figure 1:
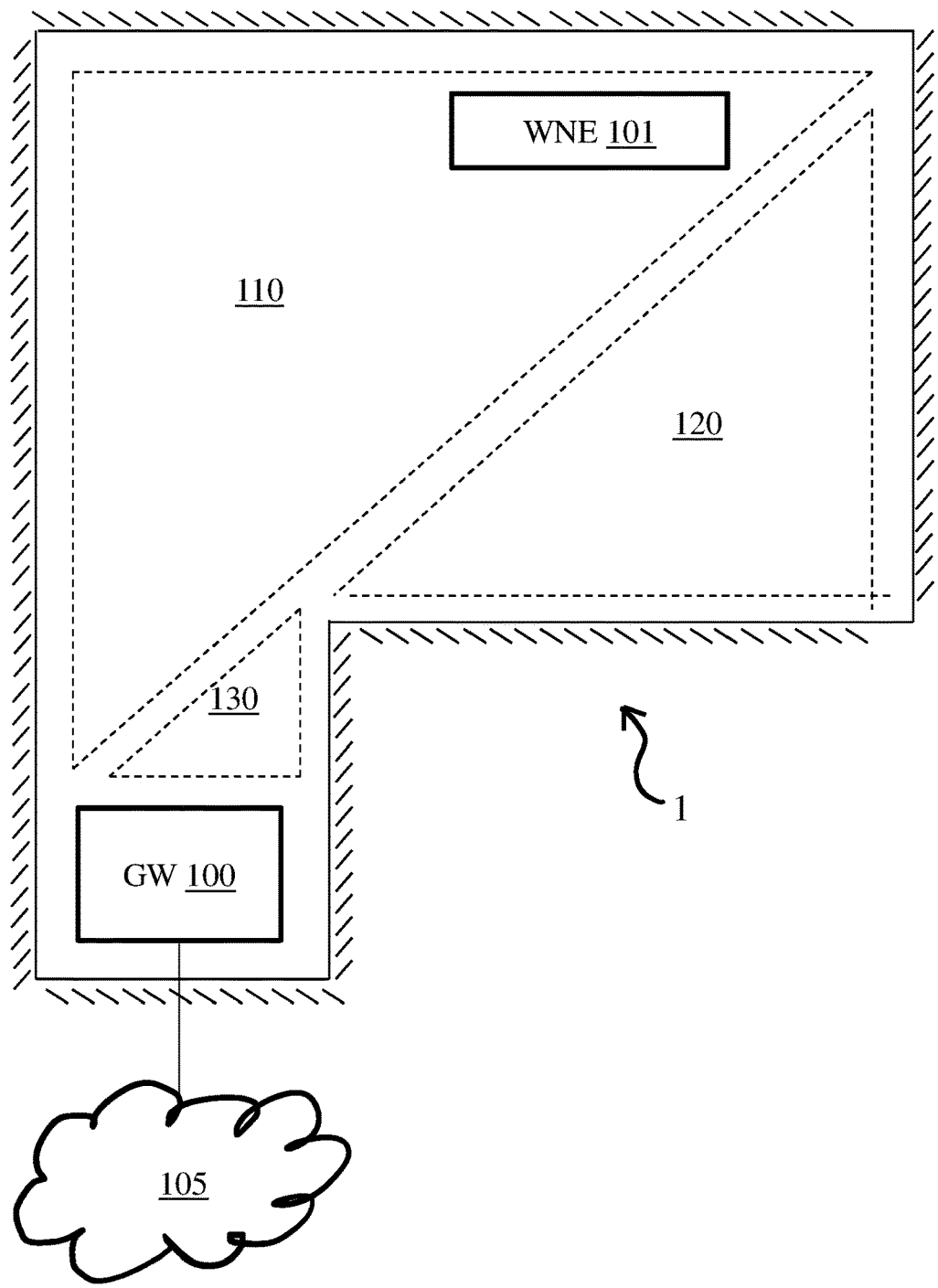
FIG. 1 is a typical building or home with a network in which embodiments of the present principles can be applied.

FIG. 1 is a space in a typical building, office or home 1, in which embodiments of the present principles can be applied. A gateway GW 100 and a wireless network extender WNE 101 provide wireless network client devices (not shown) with access to a local wireless network (LAN) and to a Wide Area Network (WAN) 105 such as the Internet. Broken lines delimit zones or areas 110, 120, 130 of wireless network coverage. These areas are delimited through attenuation by walls (note that reflection is not taken account of in this figure for reasons of legibility). Area 110 is covered by both the gateway GW 100 and the wireless network extender WNE 101. Area 120 is covered by the wireless network extender WNE 101 only. Area 130 is covered by the gateway GW 100 only.

Figure 2:
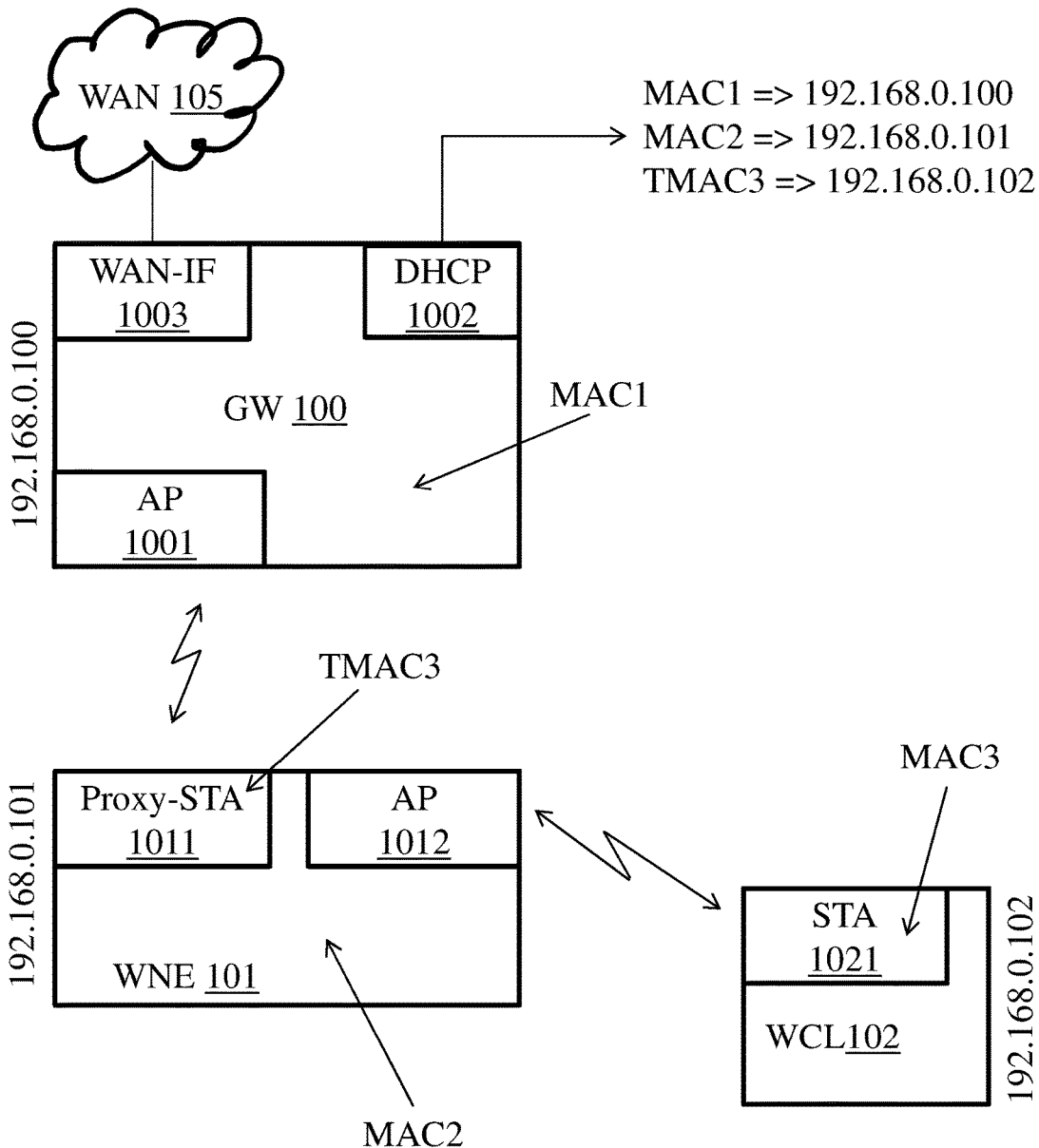
FIG. 2 is a typical block diagram of a network configuration in which embodiments of the present principles can be applied.

FIG. 2 is a block diagram of a typical network configuration in which embodiments of the present principles can be applied. The diagram comprises gateway GW 100, wireless network extender WNE 101, and a wireless network client device WCL 102 (e.g. a mobile device such as a tablet, a mobile phone or a portable PC). The network comprises a single DHCP server 1002 that is located in the gateway. Such a network configuration with a wireless network extender and a single DHCP server in the network has the advantage to be relatively simple and straightforward to administrate and maintain and is suited, for example, for a small to medium sized local area network. The gateway further comprises a WAN-interface WAN-IF 1003 and a wireless access point AP 1001. In the following, the terminology 'station' (STA) and 'access point' (AP) are used which are terms that are commonly used terms in the field of data communication. The wireless network extender WNE 101 comprises a wireless station PROXY-STA 1011 and wireless access point AP 1012. Wireless network client device WCL 102 comprises a wireless station STA 1021. The WAN interface WAN-IF 1003 of gateway GW 100 is connected to a Wide Area Network WAN 105, e.g. the Internet. The proxy station Proxy-STA 1011 of Network Extender WNE 101 wirelessly exchanges data with wireless access point AP 1001 of gateway GW 100. Wireless network client device WCL 102 wirelessly exchanges data with access point AP 1012 of wireless network extender WNE 101 via wireless station STA 1021. Gateway 100 has MAC address MAC1. Wireless network extender WNE 101 has MAC address MAC2. Wireless network client device WCL 102 has MAC address MAC3. Note that the IP addresses are arbitrarily chosen from an IP address space range for private networks as defined by the Internet Assigned Numbers Authority (IANA).

Figure 3:
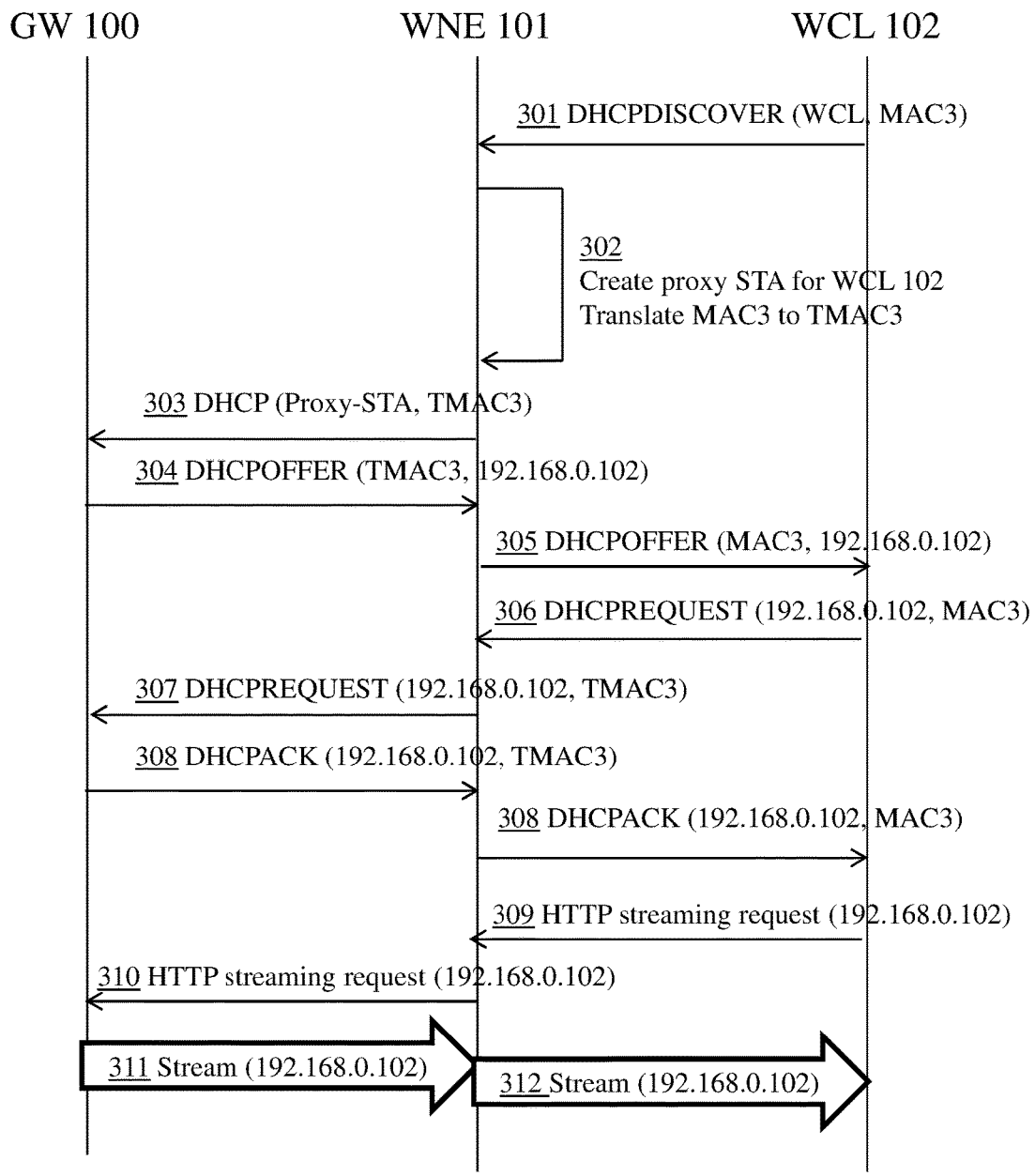
FIG. 3 is a typical sequence chart of messages exchanged between different devices of the network of FIG. 2, in which embodiments of the present principles can be applied.

FIG. 3 is a typical sequence chart of messages exchanged between the different devices of a network in which embodiments of the present principles can be applied. DHCP operates according to four phases, referred to as DORA for server Discovery, Offer, Request and Acknowledgement. In a first phase, a client broadcasts a DHCPDISCOVER request on the network, the request comprising the client's MAC address. In a second phase, the DHCP server reserves an IP address for the client and makes a lease offer by sending a DHCPOFFER message to the client, the message comprising the proposed IP address. The proposed IP address is based on the client's MAC address. In the third phase, in response to the DHCP offer, the client replies with a DHCPREQUEST message, requesting the offered IP address. Finally, in a fourth phase, the DHCP server acknowledges the client's acceptance by sending a DHCPACK message to the client. This completes the IP address configuration process.

According to the scenario depicted in FIG. 3, wireless network client device WCL 102 is in area 120 that is covered only by the wireless network extender WNE 101, and connects to the wireless network offered by the wireless network extender. Therefore, wireless network client device WCL 102 transmits (301) a DHCPDISCOVER message over the network in order to obtain an IP address. The request comprises the MAC address (MAC3) of wireless network client device WCL 102. Wireless network extender WNE 101 creates (302) a proxy station (or virtual client) Proxy-STA 1011, to represent the wireless network client device WCL 102 before the gateway's access point AP 1001. Wireless network extender WNE 101 also attributes (302) a MAC address to proxy-STA 1011, i.e. TMAC3 (for Translated MAC address; also referred to as 'virtual' MAC address). Note that the wireless network extender creates as many proxy stations as network client devices that are connected to it. Proxy-STA 1011 of wireless network extender WNE 101 forwards (303) the DHCPDISCOVER request from the wireless network client device WCL 102 to the gateway GW 100's access point AP 1001, while replacing the MAC address (MAC3) of wireless network client device WCL 102 by the translated MAC address (TMAC3). Gateway GW 100 replies (304) with a DHCPOFFER message comprising an unused IP address for proxy-STA 1011 (unused=not used in the context of the local network, and within the IANA address space defined for private networks). The wireless network extender WNE 101 forwards (305) the DHCPOFFER message to the wireless network client device WCL 102, while replacing TMAC3 by MAC3. In response, the wireless network client device WCL 102 transmits (306) a DHCPREQUEST to the wireless network extender WNE 101 to request the offered IP address. This message is forwarded (307) by WNE 101 to GW 100 while replacing the MAC address in the request (MAC3) by its translated MAC address (TMAC3). The DHCP server replies with a DHCPACK message, which the wireless network extender WNE 101 forwards to wireless network client device WCL 102 while replacing the translated MAC address in the message (TMAC3) by the real MAC address of the wireless network client device (MAC3). This completes the IP address configuration process for wireless network client device WCL 102. Consequently, the DHCP server in gateway GW 100 has for example allocated the following IP addresses to the following MAC addresses:

192.168.0.100 to the gateway GW 100 with MAC address MAC1;

192.168.0.101 to the wireless network extender WNE 101 with MAC address MAC2;

192.168.0.102 to the representation of wireless network client device WCL 102 with MAC address TMAC3.

Now that an IP address is given to wireless network client device WCL 102, it can for example issue a HTTP request (309) for receiving (311, 312) a video stream on a web site. The wireless network extender relays the HTTP request (309, 310) and the stream (311, 312) to the wireless network client device WCL 102. The stream is possibly received from the gateway, or from any other local network device or from one or more distant servers that is/are located in the Wide Area Network 105.

Figure 4:
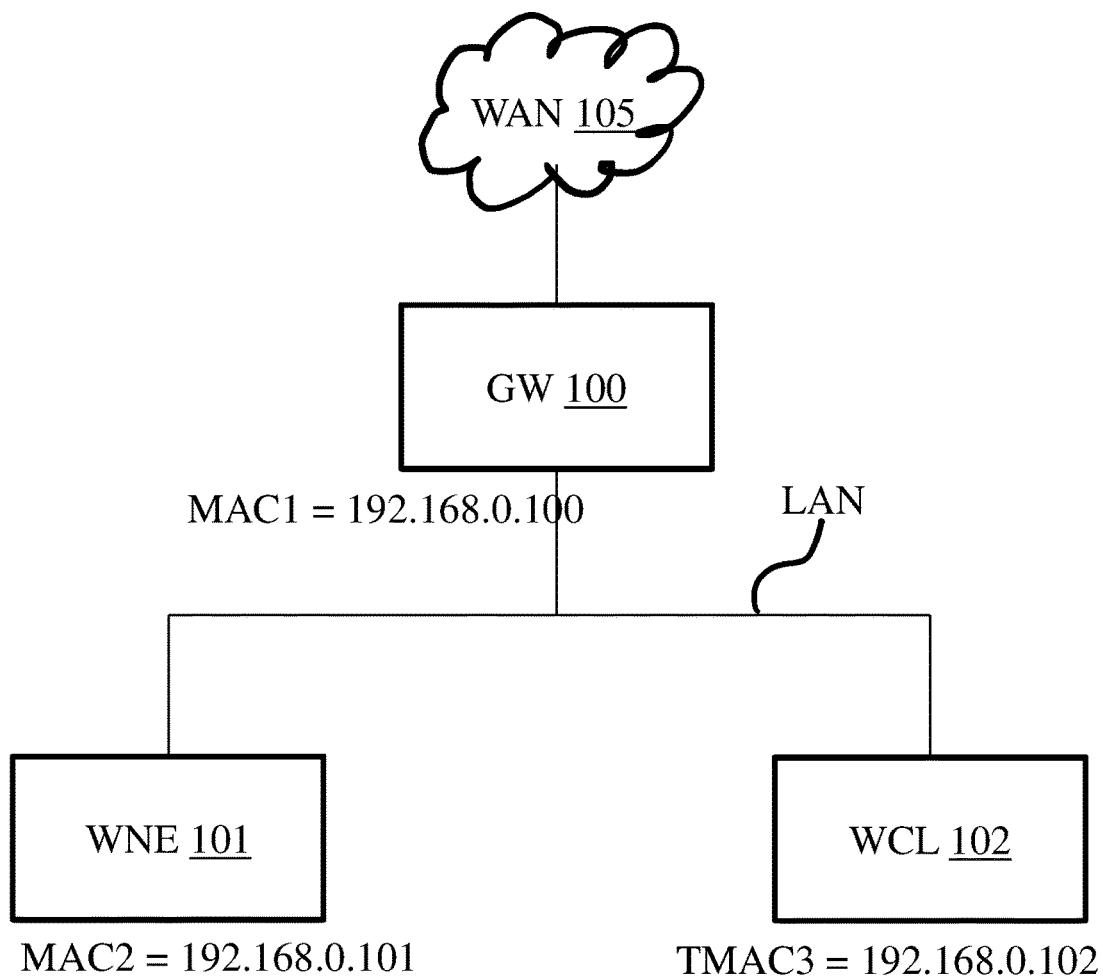
FIG. 4 is a typical logical diagram of the network in which embodiments of the present principles can be applied.

FIG. 4 is a typical logical diagram of the local network in which embodiments of the present principles can be applied and that is now constructed following the scenario of FIG. 3. Three devices are connected to the network: gateway GW 100, wireless network extender WNE 101, and wireless network client device WCL 102. The gateway GW 100 recorded in its memory, e.g. in the DHCP server memory, or in ARP accessible memory. a correspondence between IP addresses and MAC addresses of the different devices and thus 'knows' these devices by their MAC addresses: MAC1, MAC2, and TMAC3. MAC address MAC3 is not recorded in memory of the gateway GW 100 and remains therefore 'unknown' to it. The MAC address translation is done by the wireless network extender to avoid data collision (and by consequence an impossibility to communicate) when the wireless network client device WCL 102 roams to an area that has wireless coverage of both the gateway and the wireless network extender, such as area 110 of FIG. 1 (='common coverage area'). If the MAC address of the wireless network client device and that of its representation by the wireless network extender were the same, both the wireless network extender and the network client device would reply to messages from the gateway when the wireless network client device would be in the common coverage area. This is notably the case for acknowledge (ACK) messages that these devices would transmit to a transmitter of a message. Wireless network communication protocols often make use of acknowledgement mechanisms that allow a transmitter of a message to be sure that a transmitted message has indeed been received by a destination device. The DHCPACK message is an example of such an acknowledge message. The response time for acknowledgement by means of an acknowledge message is defined by the applicable protocol. For wireless interfaces, the time within which an acknowledgement should be transmitted is defined by the Short Inter Frame Space (SIFS). If two acknowledgements to a same message would be transmitted at the same time, this would cause a data collision that would make further communication impossible as the simultaneous transmission would render the acknowledge unreadable. This would be the case for example if the wireless network client device WCL 102 is in area 110 and the wireless network extender WNE 101 would not apply MAC address translation; then, following a message transmitted as a unicast frame from the access point in the gateway GW 100, the recipients of the unicast frame will reply with an acknowledge message (e.g. a WiFi MAC layer ACK as transmitted by the receiver of the unicast frame). In this case, both the wireless network client device WCL 102 and the wireless network extender WNE 101 would reply with an acknowledge message, the latter because it represents the wireless network client device WCL 102 before the gateway GW 100. Thus, while the MAC address translation solves the problem of communication loss in the area of common coverage, it causes another problem related to IP session continuity.

Figure 5:
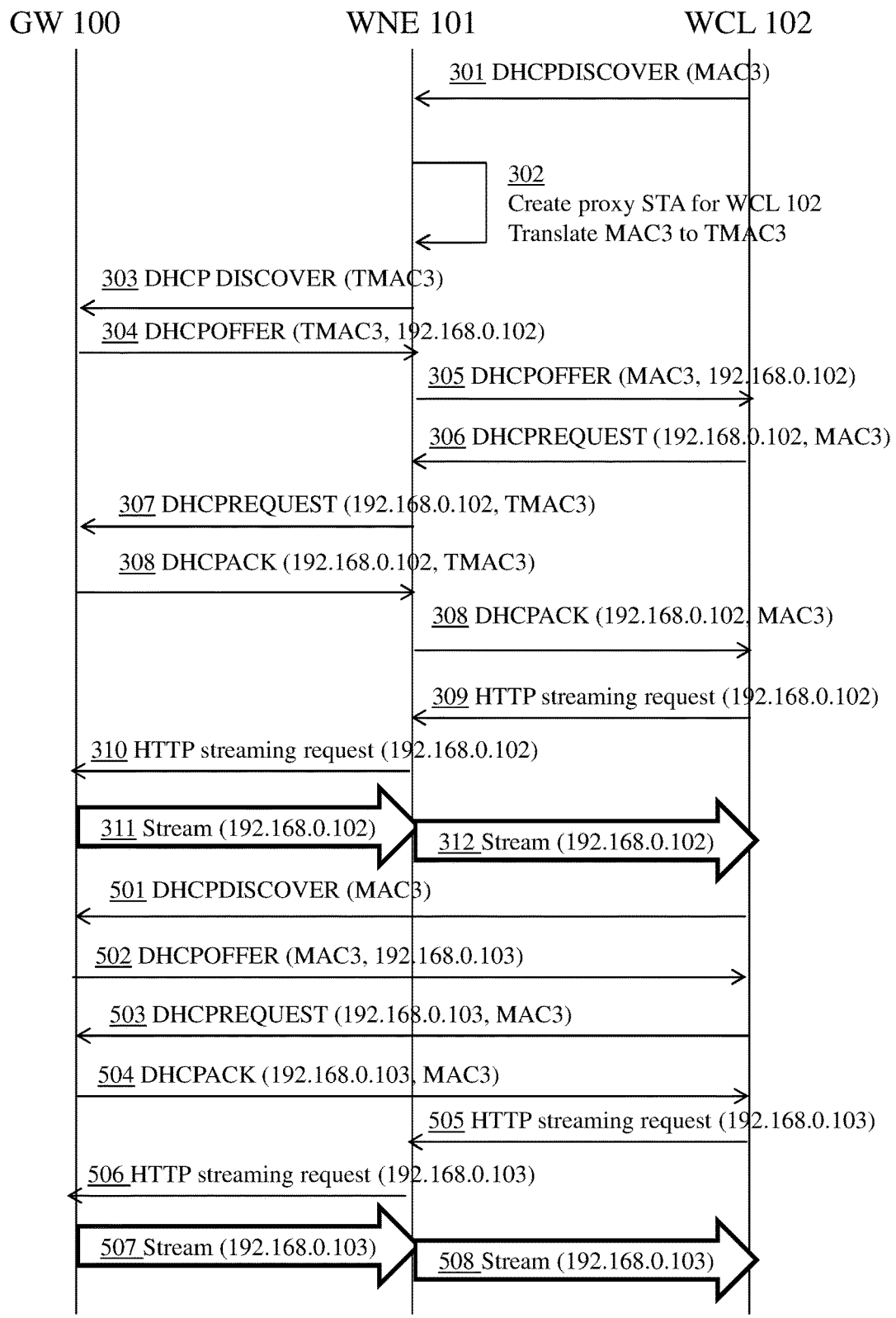
FIG. 5 is a typical sequence diagram illustrating a problem of IP session continuity occurring with prior techniques.

FIG. 5 is a typical sequence diagram that illustrates a problem that occurs with prior techniques when roaming. Arrows 301 to 312 have already been explained with regard to FIG. 3 and are not explained here again. According to the scenario of FIG. 5, the wireless network client device WCL 102 roams from area 110 to area 130 while receiving the video stream. As it roams from area 110 to area 130, it leaves the coverage area of the wireless network extender WNE 101 and enters the coverage area of the gateway GW 100. In area 130, the wireless network client device WCL 102 will try to reconnect to the available wireless network and therefore issues a DHCPDISCOVER request (501) that is received by DHCP server 1002 in gateway GW 100. The DHCP request comprises the requester's MAC address. Wireless network client device WCL 102 has MAC address MAC3. However, this MAC address is 'unknown' to the DHCP server in the gateway; it 'knows' the wireless network device client by its translated MAC address TMAC3, as translated by the wireless network extender WNE 101. The DHCP server will thus propose (502, DHCPOFFER) an unused IP address e.g. 192.168.0.103 to the 'unknown' MAC address MAC3, which is then accepted (503, DHCPREQUEST) by the wireless network client device WCL 102 and acknowledged (504, DHCPACK) by the DHCP server. Consequently, the DHCP server in gateway GW 100 has allocated the following IP addresses to the following MAC addresses:

MAC1: 192.168.0.100 (gateway GW 100);

MAC2: 192.168.0.101 (wireless network extender WNE 101);

TMAC3: 192.168.0.102 (translated MAC address, representation of wireless network client device WCL 102);

MAC3: 192.168.0.103 (real MAC address of wireless network client device WCL 102).

As the wireless network client device WCL 102 is attributed another IP address when it roamed from area 120 to area 130 (its IP address changed from 192.168.0.102 to 192.168.0.103), any data communication based on the 'old' IP address (192.168.0.102) of the wireless network client device WCL 102 is disrupted, such as the illustrated video streaming. The wireless network client device WCL 102 has to issue a new video streaming request (505, 506) with its new IP address 192.168.0.103 when it wishes to set up the video streaming again. The stream received (507, 508) will restart from the beginning. Seamless roaming from one area to another is thus not ensured.

Additionally, the above mentioned MAC address translation is problematic when the gateway GW 100 applies so-called MAC address filtering. MAC address filtering is a security access control method implemented by DHCP servers whereby MAC addresses are used to determine access to a network. Using MAC filtering, network access is permitted and denied through the use of a MAC address whitelist of authorized MAC addresses. The whitelist is a list of allowable MAC addresses. Such a whitelist is generally manually configured by a network administrator. Following the previous example, the network administrator would have added the translated MAC address TMAC3 of wireless network client device WCL 102 to the whitelist of MAC addresses that are allowed to access the local network. Now when the wireless network client device WCL 102 roams from area 120 to 130 and requests an IP address from the DHCP server in gateway GW 100 based on its real MAC address MAC3, the DHCP server will refuse access to its services for the wireless network client device WCL 102 as it is not in its whitelist of authorized MAC addresses. The wireless network client device WCL 102 will thus not obtain an IP address and network access will be refused in area 130, unless the network administrator manually adds the real MAC address MAC3 to the whitelist. In the following it will become clear how the present principles provide solutions to these problems. Further knowledge on what is a MAC address and how MAC address translation is done is useful.

Figure 6:
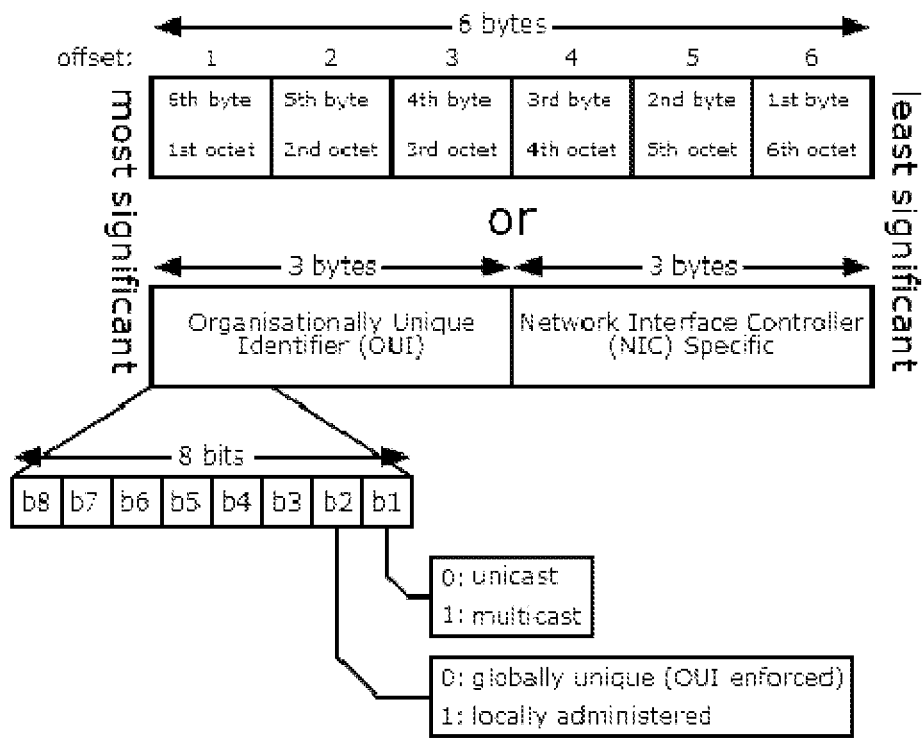
FIG. 6 is an example 48-bit MAC address used in the context of IEEE 802 networks of an embodiment in accordance with the present principles.

FIG. 6 is a 48-bit MAC address used for example in the context of IEEE 802 (source: Wikipedia). A 48-bit MAC address is typically used for IPv4 networks. For IPv6 networks, a 64-bit MAC address is used. Every device that connects to a network that uses MAC addressing (such as 802.11 Ethernet and WiFi) has a MAC address. The most significant three octets of the MAC address identify the organization that issued the identifier and are known as the Organizationally Unique Identifier (OUI). Universally administered and locally administered addresses are distinguished by setting the second-least-significant bit (b2) of the most significant byte of the MAC address. This bit is also referred to as the U/L bit, short for Universal/Local, which identifies how the MAC address is administered. If the bit is 0, the MAC address is universally administered. If it is 1, the MAC address is locally administered.

Figure 7:
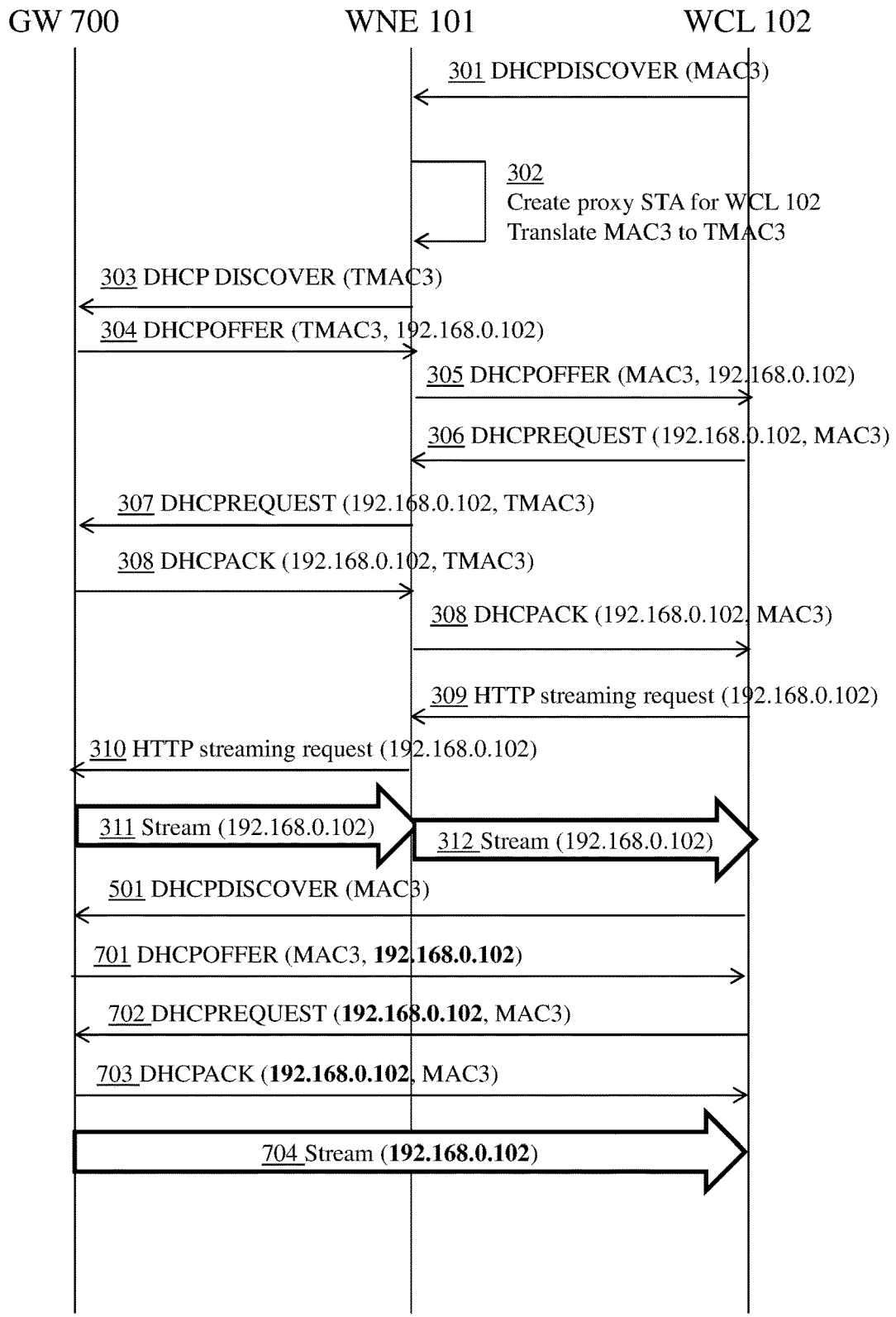
FIG. 7 is an example sequence chart of a roaming client of an embodiment in accordance with the present principles.

FIG. 7 is a sequence chart of a roaming client according to the present principles. Arrows 301-312 and 501 have already been explained with reference to FIG. 5 and are not explained here again. According to the present principles, a wireless network extender employs MAC address translation based on toggling of the U/L bit of the MAC address. Based on knowledge of the MAC address translation process implemented by the wireless network extender, the gateway 700 DHCP server can execute a same and a reverse operation when required.

According to the present principles, if the DHCP server receives a request (e.g. DHCPDISCOVER 501) for allocation of an IP address for a MAC address that is 'unknown', it verifies if the 'unknown' MAC address is possibly a translation of a 'known' MAC address. If so, the DHCP server looks up the IP address corresponding to the 'known' MAC address and transmits a message to the wireless network client (e.g. DHCPOFFER 701) containing the corresponding IP address. As this is the same IP address as the wireless network client device had before roaming, the wireless network client keeps the same IP address (702 DHCPREQUEST, 703 DHCPACK), and IP session continuity is ensured for the roaming wireless network client device; video delivery to the wireless client device WCL 102 continues (704) where it was interrupted during the disconnection and reconnection to the wireless network.

According to a variant embodiment, the gateway, after having modified the MAC address—IP address correspondence for a device, transmits an announcement message for informing other devices on the network of the changed MAC address—IP address correspondence. An example of such announcement message is the so-called gratuitous ARP message, which is not intended to solicit a reply but that updates any cached entries in ARP tables of other network devices that receive the message.

According to a variant embodiment that is useful for MAC filtering, if after verification the 'unknown' MAC address is the same as a MAC address that is already in the MAC filtering whitelist, the MAC filtering process can consider that 'unknown' MAC address is the translated MAC address of a known and authorized MAC address, and give access to the DHCP services to the 'unknown' MAC address and can update the whitelist if necessary with the 'unknown' MAC address. The update is for example a replacement, in the MAC address filtering whitelist, of the 'known' MAC address (i.e. the translated MAC address) by the 'unknown' MAC address (i.e. the MAC address of the wireless network client). This avoids tedious, manual entering of the new MAC address in the whitelist and avoids communication disruption for roaming wireless network client devices.

According to a variant embodiment of the present principles, the operation of verifying if a given MAC address is a translated MAC address or vice versa is done by toggling the U/L bit and then checking if the MAC address with the toggled U/L bit corresponds to a known MAC address. This toggling operation is for example done by applying a logical XOR operation to the MAC address to verify with a bit mask where only the U/L bit is set to one, e.g.:

MAC verify=(MAC unknown)XOR(0x02 00 00 00 00)

for a 48-bit MAC address.

According to a variant embodiment, the DHCP server, before considering that a given 'unknown' MAC address is equivalent to another, 'known' MAC address, transmits a verification message to the IP address corresponding to the 'known' MAC address. If the verification message is replied to or acknowledged, the 'unknown' MAC address is not equivalent to the 'known' MAC address and the DHCP server attributes an unused IP address to the 'unknown' MAC address and transmits the attributed unused IP address to the wireless network client.

According to a particular embodiment, the verification message is an IP PING message. PING messages are among others used to test the reachability of a device on an IP network. It operates by sending an ICMP (Internet Control Message Protocol) request packet to a target and waits for an ICMP response.

According to a variant embodiment, the verification message is an ARP (Address Resolution Protocol) probe packet.

The MAC address translation as implemented by the wireless network extender can comprise a modification of the last bytes of the OUI. According to a variant embodiment, the DHCP server first toggles the U/L bit of the MAC address received in a request for an IP address and verifies if the resulting MAC address corresponds to a 'known' MAC address. If not, it increases the last two bytes of the OUI of the resulting MAC address and verifies again if the resulting MAC address corresponds to a 'known' MAC address. The operation of increasing and verifying can be repeated several times until a 'known' MAC address is found or until the last two bytes of the OUI cannot be increased anymore. This variant embodiment can be improved by the above discussed transmission of a verification message to the IP address corresponding to the 'known' MAC address if the resulting MAC address corresponds to a 'known' MAC address.

According to a variant embodiment, if the DHCP server, after verification, finds that a given MAC address is equivalent to a 'known' MAC address, it does not update the memory in the DHCP server.

According to a variant embodiment, the DHCP server updates its memory, e.g. a relation to the given MAC address is added to the existing relation between the 'known' MAC address and the IP address attributed to it.

Figure 8:
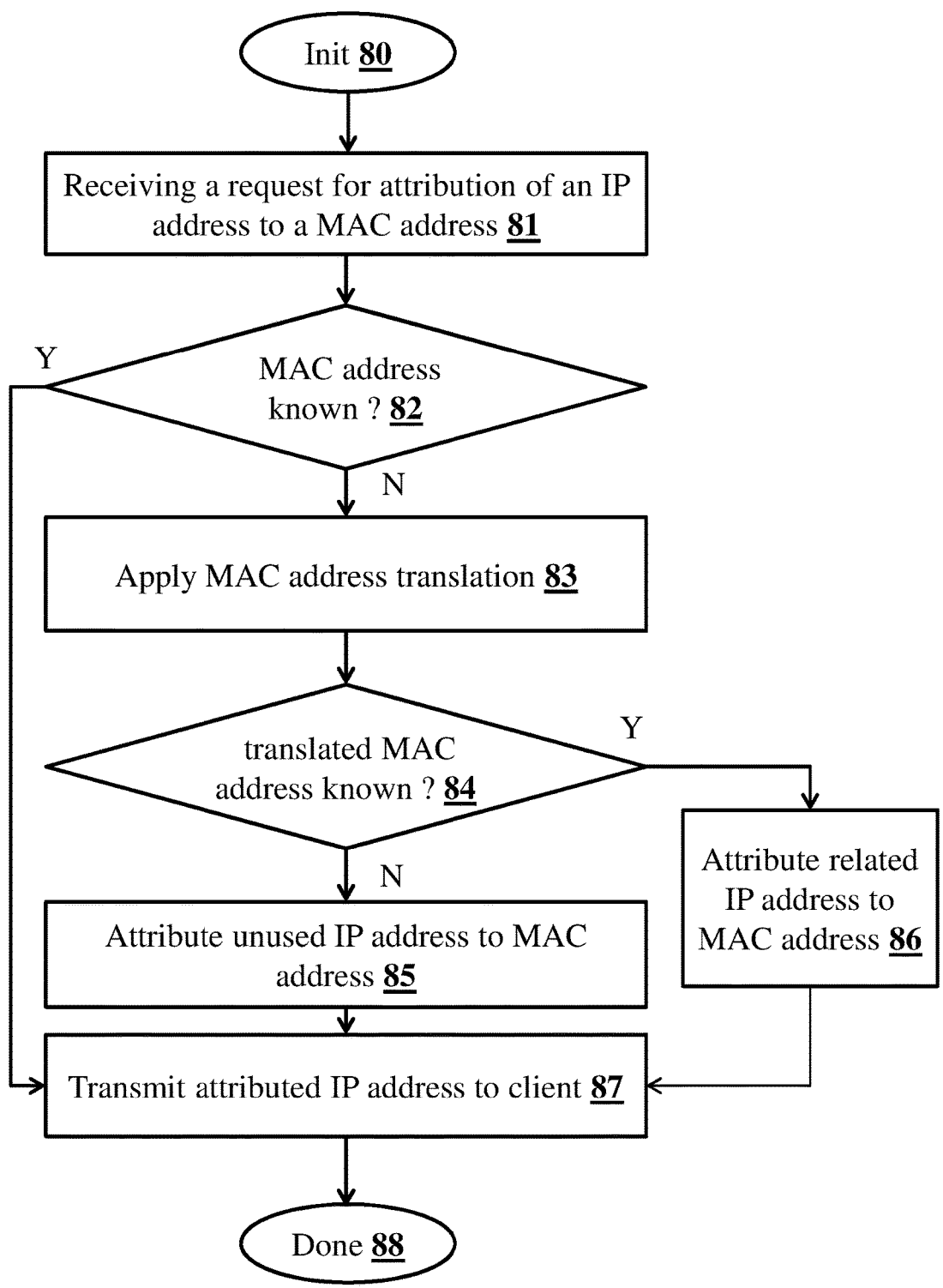
FIG. 8 is an example flow chart of an advantageous embodiment of a method in accordance with the present principles.

FIG. 8 is a flow chart of an advantageous embodiment of a method according to the present principles. Step 80 is an initialization step that is for example executed during startup of the device implementing the present principles, e.g. by an Internet Protocol address server implemented in a gateway 700. In a step 81, a request is received from a client device of a communication network comprising the IP address server, for attribution of an Internet Protocol address to a Media Access Control address, the request comprising said Media Access Control address. In a step 82, it is verified if the Media Access Control address comprised in the request is known. The MAC address is known if an IP address is already attributed to the MAC address by the IP address server. If the MAC address is known, the known or already attributed IP address is transmitted to the requesting client device in a step 87 and the method ends with step 88. If the MAC address is however not known, i.e. no IP address is yet attributed to the MAC address comprised in the request, a MAC address translation is done in a step 83. This MAC address translation is for example according to the various described embodiments. Then, in a step 84, it is verified if the translated MAC address corresponds to a known MAC address, that is, if an IP address is already attributed by the IP address server to the translated MAC address. If the translated MAC address is known, the IP address that is already attributed to the translated MAC address, i.e. the 'related' IP address, is attributed to the MAC address in a step 86. If however in step 84 it is determined that the translated MAC address is also unknown, e.g. there is no IP address already attributed to the translated MAC address, an unused IP address is attributed to the MAC address in a step 85. Then, in step 87, the attributed IP address is transmitted to the requesting client device, and the method ends with step 88.

Figure 9:
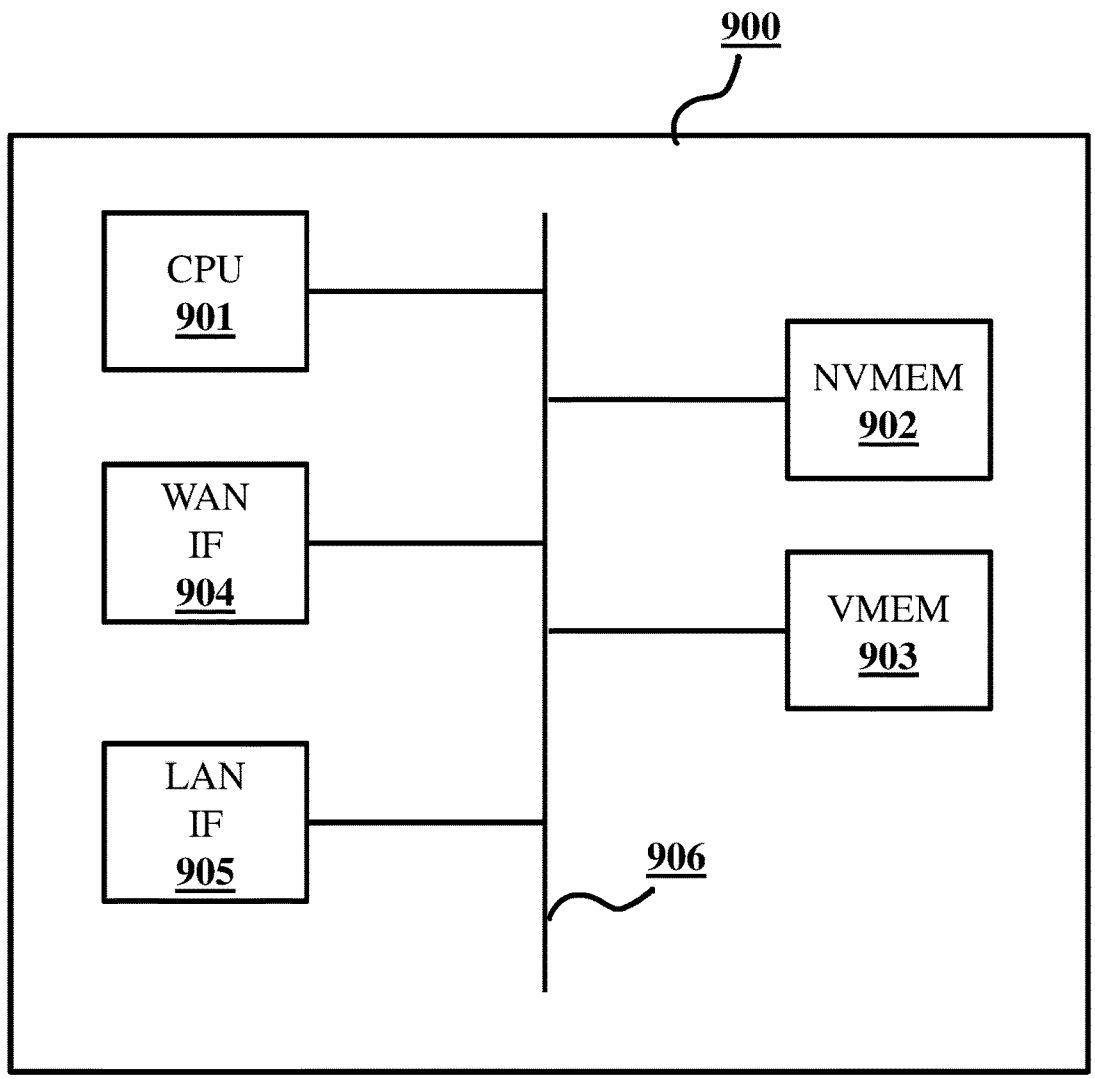
FIG. 9 is an example device of an embodiment in accordance with the present principles.

FIG. 9 is an example device 900 implementing the present principles. The device corresponds for example to gateway 700 of FIG. 7. The device comprises a central processing unit (CPU) or processor 901, a Wide Area Network interface 904, a Local Area interface 905, a non-volatile memory NVMEM 902, and a memory MEM 903, interconnected by means of an internal high speed communication bus 906. The non-volatile memory stores the program instructions that are executed by the processor upon startup, such as program instructions that comprise the method for allocation of IP addresses to client devices of a communication network according to the present principles, lookup tables and variables that required to be retained in memory even when the device is powered down, for example an IP address—MAC address correspondence lookup table. The memory 903 comprises memory space that is used during execution of the method according to the present principles, such as program instructions copied from non-volatile memory 902 upon startup of the device, temporary memory buffer zones, lookup tables and variables that need not to be retained when the device is powered down.

The present principles can also apply to wired connections; for example, client devices that are wired to a repeater and then unplug and wander into gateway area coverage in a wireless or wired fashion.

Embodiments of the present principles can be implemented in a DHCP server. The DHCP server can be implemented in any network device, such as in a gateway, in a network extender, or in a network client device. The wireless network extender can for example be included in another network device, such as a Set Top Box.

Some elements in the drawings may not be used or be necessary in all embodiments. Some operations may be executed in parallel. Other variant embodiments than illustrated and/or described are possible, such as embodiments where the signal processing unit is separated from the control unit.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for allocation of Internet Protocol addresses to network devices in a communication network to avoid Internet Protocol session discontinuity for the network devices, wherein said communication network comprises an Internet Protocol address server and a memory and said method is implemented by said Internet Protocol address server, said method comprising:

receiving, from a first network device of said network devices in said communication network, a request for attribution of an Internet Protocol address to a Media Access Control address, the request comprising said Media Access Control address;

retrieving information from the memory to determine if an Internet Protocol address is attributed to the Media Access Control address;

if an Internet Protocol address is not attributed to the Media Access Control address, applying a Media Access Control address translation to the Media Access Control address, to obtain a translated Media Access Control address;

retrieving information from the memory to determine if an Internet Protocol address is attributed to the translated Media Access Control address; and if an Internet Protocol address is attributed to the translated Media Access Control address, retrieving from the memory the Internet Protocol address attributed to the translated Media Access Control address and transmitting, to said first network device, the Internet Protocol address attributed to the translated Media Access Control address.

2. The method according to claim 1, wherein the method further comprises verifying if the translated Media Access Control address is not used by any of said network devices, said verifying comprising:

transmitting a message to said translated Media Access Control address; and checking that no reply is received to said message.

3. The method according to claim 2, wherein said message is an Internet Protocol PING message.

4. The method according to claim 2, wherein said message is an Address Resolution Protocol probe packet.

5. The method according to claim 1, wherein the Media Access Control address translation comprises toggling of a globally unique/locally administered bit comprised in the most significant byte of the Organizationally Unique Identifier of the Media Access Control address comprised in said request.

6. The method according to claim 5, wherein said toggling is a logical exclusive logical Boolean OR operation with a bit mask applied to said Media Access Control address comprised in said request.

7. The method according to claim 1, further comprising a transmission of an announcement message over said communication network to inform said network devices of a correspondence between the Media Access Control address of said first network device and of said Internet Protocol address transmitted to said first network device.

8. The method according to claim 1, further comprising:

verifying if said translated Media Access Control address is on a list of allowable Media Access Control addresses for Media Access Control address filtering; and if said translated Media Access Control address is on a list of allowable Media Access Control addresses for Media Access Control address filtering, updating of said list of allowable Media Access Control addresses for Media Access Control address filtering with said Media Access Control address of said first network device.

9. An Internet Protocol address server for allocation of Internet Protocol addresses to network devices in a communication network to avoid Internet Protocol session discontinuity for the network devices, wherein the Internet Protocol address server comprises:

a network interface, configured to receive, from a first network device of said network devices, a request for attribution of an Internet Protocol address to a Media Access Control address, the request comprising said Media Access Control address;

a processor in communication with a memory;

the processor configured to retrieve from the memory information from the memory to determine if an Internet Protocol address is attributed to the Media Access Control address;

the processor configured to apply a Media Access Control address translation to the Media Access Control address, to obtain a translated Media Access Control address if an Internet Protocol address is not attributed to the Media Access Control address;

the processor configured to retrieve from the memory information from the memory to determine if an Internet Protocol address is attributed to the translated Media Access Control address; and said network interface being further configured to transmit, to the first network device, an Internet Protocol address, retrieved by the processor from the memory, attributed to the translated Media Access Control address if an Internet Protocol address is attributed to the translated Media Access Control address.

10. The Internet Protocol address server according to claim 9, wherein the processor is further configured to verify if the translated Media Access Control address is not used by any of said network devices, and said network interface being further configured, if it is verified by said processor that the translated Media Access control address is not used by any of said network devices, to transmit a message to said translated Media Access Control address; and to check that no reply is received to said message.

11. The Internet Protocol address server according to claim 10, wherein said message is an Internet Protocol PING message and said network interface is further configured to transmit said Internet Protocol PING message.

12. The Internet Protocol address server according to claim 10, wherein said message is an Address Resolution Protocol probe packet and said network interface is further configured to transmit said Address Resolution Protocol probe packet.

13. The Internet Protocol address server according to claim 9, wherein the processor is further configured to execute said Media Access Control address translation by toggling a globally unique/locally administered bit comprised in the most significant byte of the Organizationally Unique Identifier of the Media Access Control address comprised in said request.

14. The Internet Protocol address server according to claim 13, wherein said processor is further configured to execute said toggling by applying a logical exclusive logical Boolean OR operation with a bit mask applied to said Media Access Control address in said request.

15. The Internet Protocol address server according to claim 9, wherein said network interface is further configured to transmit an announcement message over said communication network to inform said network devices of a correspondence between the Medium Access Control address of said first network device and of said Internet Protocol address transmitted to said first network device.

16. The Internet Protocol address server according to claim 9, wherein said Internet Protocol address server is implemented in a gateway.

* * * * *